SCRAMBLED TELEVISION TRANSMISSION

Original Filed Nov. 9, 1951 5 Sheets-Sheet 1

INVENTOR
WILLIAM J. SHANAHAN

BY Cushman, Darby & Cushman
ATTORNEY

INVENTOR
WILLIAM J. SHANAHAN

BY Cushman, Darby & Cushman

ATTORNEY

Feb. 9, 1960 W. J. SHANAHAN 2,924,645

SCRAMBLED TELEVISION TRANSMISSION

Original Filed Nov. 9, 1951 5 Sheets-Sheet 3

INVENTOR
WILLIAM J. SHANAHAN

BY Cushman, Darby & Cushman
ATTORNEY

INVENTOR
WILLIAM J. SHANAHAN

BY Cushman, Darby & Cushman
ATTORNEY

INVENTOR
WILLIAM J. SHANAHAN

BY Cushman, Darby & Cushman
ATTORNEY

United States Patent Office 2,924,645
Patented Feb. 9, 1960

2,924,645

SCRAMBLED TELEVISION TRANSMISSION

William J. Shanahan, New York, N.Y., assignor to Skiatron Electronics & Television Corporation, New York, N.Y., a corporation of New York Continuation of application Serial No. 255,555, November 9, 1951. This application September 4, 1956, Serial No. 607,739

22 Claims. (Cl. 178—5.1)

This invention relates to the scrambled transmission of television pictures and the like.

Briefly, the invention provides means to scramble or code a television or like transmission in such manner that a receiver not equipped with special apparatus shows an image that cannot be understood or is difficult or uncomfortable to observe. According to the invention, the picture or portions thereof are caused to move among a plurality of positions on the receiver screen and preferably at a reasonably high rate of speed but slow enough for flicker tendency. Therefore the image may appear as a conventional picture but one having multiple ghosts with each ghost just as strong as the original or main image, or the image may assume other characteristics confusing to the eye, depending on the particular code employed. In addition, the rate of change of position may be slow enough to make the screen seem to flicker. However, the image is caused to be properly reconstituted by the insertion of a specially punched card or other suitable sensing device in the receiver. By the herein invention, no auxiliary transmission channels are required. That is, all signals are transmitted over the television channel without requiring the use of telephone lines and the like.

The primary object of my invention is to provide improved means for transmitting scrambled television and like signals.

A further object of my invention is to provide means for transmitting television or like signals having a complete set of synchronizing signals but with image or picture signals coded with respect to at least predetermined ones of the standard synchronizing signals.

It is a further object of my invention to provide means for transmitting scrambled television or like signals without use of auxiliary transmission means such as telephone lines.

It is a further object of my invention to provide means for transmitting scrambled television and like signals within a single transmission channel.

It is a further object of my invention to provide means for receiving a scrambled television or like transmission wherein the image or picture signals are in code relationship to standard synchronizing signals also included in the transmission.

It is a further object of my invention to provide an unscrambled unit which may be readily adapted to conventional television receivers.

It is a further object of my invention to provide means for developing coded synchronizing signals employing an auxiliary cathode ray tube and associated light-sensitive devices which function in cooperation with a punched card or the like bearing punched apertures arranged according to a code.

Further objects and the entire scope of my invention will become further apparent from the following detailed description and from the appended claims. The detailed description given below is for purposes of illustration only and is not intended to limit the scope of the invention.

The invention may be further understood with reference to the accompanying drawing in which.

Figure 9:
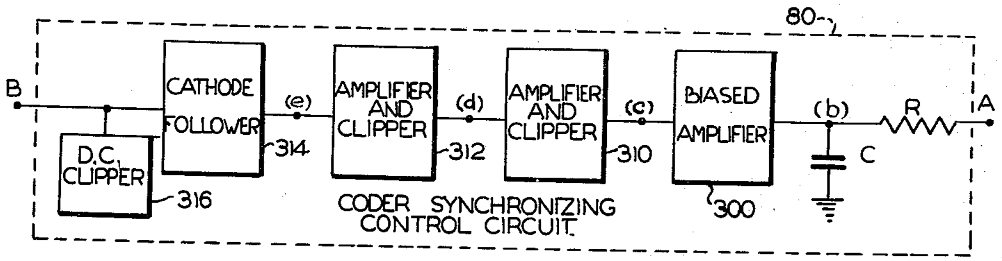
Figures 10A, 10B:
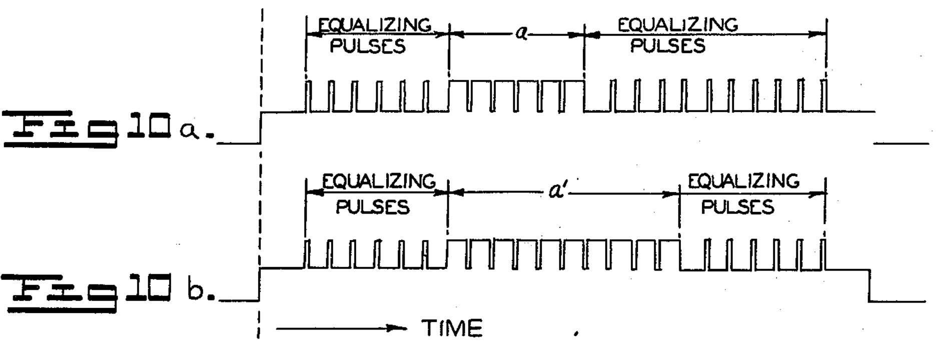
Figure 11:
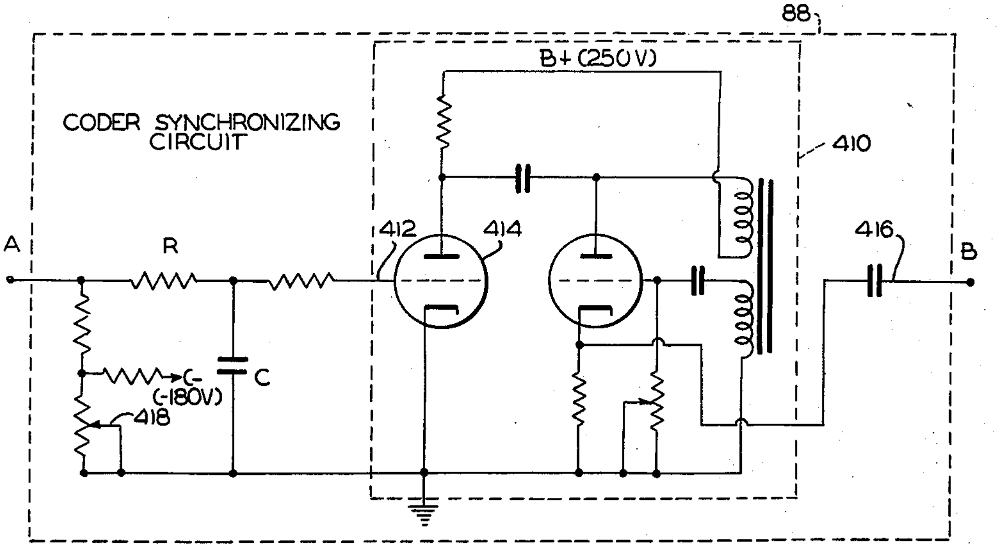

Figures 8(*a*)–(*h*) show a set of waveforms;

Figure 9 shows a scrambler synchronizing control circuit employed in my invention;

Figures 10(*a*) and 10(*b*) show waveforms of transmitted synchronizing signals, and Figure 11 shows a scrambler synchronizing circuit employed in my invention.

Figures 1, 2, 3, 4:
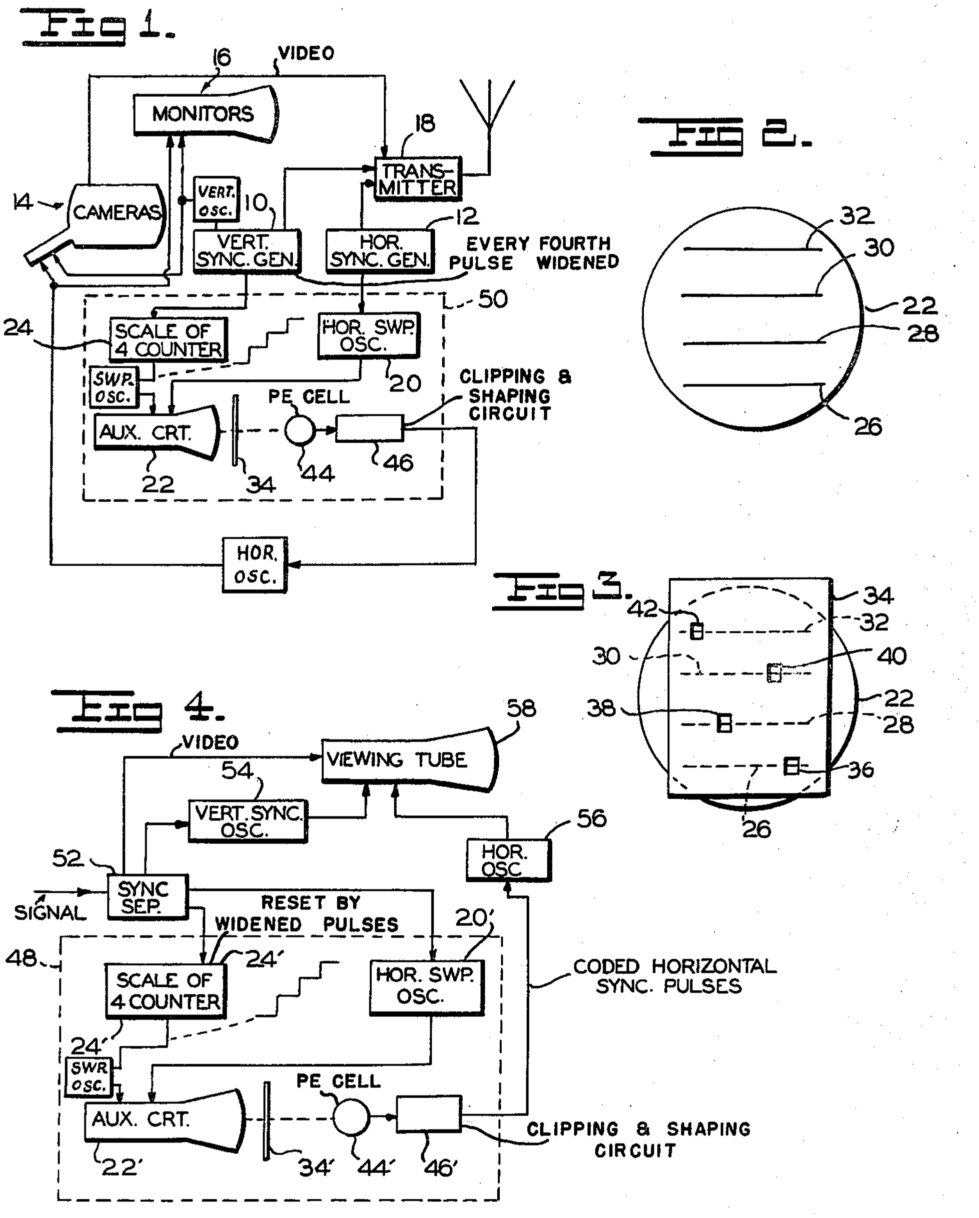
Figure 1 shows a block diagram of an arrangement at a transmitting station.
Figure 2 shows a scanning arrangement on an auxiliary cathode ray tube.
Figure 3 shows a punched card in place over an auxiliary cathode ray tube.
Figure 4 shows a block diagram of the arrangement of the receiver.

A first embodiment of my invention may be understood with reference to Figure 1. Here standard or station vertical synchronizing pulses will be generated in the vertical synchronizing generator 10 and standard horizontal synchronizing pulses generated in the horizontal synchronizing generator 12. Those skilled in the art will understand that in normal television transmission the vertical and horizontal pulses will be applied to the station cameras designated generally as 14 and to station monitor tubes designated generally as 16 and these standard vertical and horizontal synchronizing pulses will also be applied to the transmitter 18 for transmission along with the picture signals.

In the present embodiment of the invention the image is moved from side to side by displacing the horizontal synchronizing pulses. Under the present system the pulse position could be changed once every line, once every several lines, every field, every frame, or any reasonable combination. In the illustrative example which will now be given, the horizontal synchronizing pulses for each field are delayed relative to other fields and in the following manner: the horizontal synchronizing pulses from generator 12 are applied to a horizontal sweep oscillator 20 and the sweeps generated in oscillator 20 are applied to what may be conveniently termed horizontal deflection plates of an auxiliary cathode ray tube 22. Meanwhile, the vertical synchronizing pulses obtained from generator 10 are applied to a scale-of-4 counter 24 which is arranged to apply four different vertical deflection potentials to the auxiliary cathode ray tube 22. In other words, upon the occurrence of every vertical synchronizing pulse from generator 10 the scale-of-4 counter is advanced one step with the provision that every fourth vertical synchronizing pulse is applied to suitable circuits to reset the counter so that it will proceed through another series of counts. As one example of reset control, every 4th (or *n*th) pulse may be widened. As will be described more fully below, the receiving set is equipped with a similar arrangement and a widened or otherwise modified vertical pulse, which may be transmitted at the time of the retrace, permits both the transmitter and receiver to remain in synchronization.

From the system as thus far described, it will be understood that the scanning of a complete field will result in a line such as line 26 in Figure 2. Then, on the occurrence of the following vertical synchronizing pulse, the counter 24 will cause a vertical deflection in the cathode ray tube 22 and line 28 will be repeatedly scanned, the number of scans in each of the lines being equal to the number of horizontal sweeps in each field. In similar manner, as the counter 24 is advanced, lines 30 and 32 (Figure 2) will be swept under the action of the horizontal sweeps from oscillator 20.

A punched card 34 is now placed adjacent the face of cathode ray tube 22 in the orientation as illustrated in Figure 3. The punched card 34 is provided with one aperture for each of the lines 26, 28, 30, and 32. That is, as illustrated in Figure 3, the apertures 36, 38, 40, and 42 are so positioned that one aperture is placed at some position along each of the lines 26, 28, 30, and 32. Thus it will be apparent that as the position of the apertures is varied along each of the lines a large number of possible combinations is available.

A light sensitive device such as phototube 44 is placed on the side of the punched card 34 opposite the cathode ray tube 22. Therefore, at such times as the cathode ray beam in tube 22 is passing over the face of tube 22 at such positions as will register with one of the apertures 36, 38, 40, or 42, fluorescent light issuing from the tube face at those particular points will energize the phototube 44 and produce a short pulse of output current. Each pulse of output current is applied to any suitable clipping and shaping circuit including tube 46, this tube serving the purpose of generating a well defined synchronizing pulse from the pulse obtained in phototube 44. The pulses obtained from shaping tube 46 are then applied to the station cameras and station monitors for developing picture signals which will be transmitted through transmitter 18.

From the apparatus described above, it will be apparent that for each successive field, the horizontal synchronizing pulses generated in phototube 44 and applied to the station cameras will be delayed an amount equal to the time required for the horizontal sweep in the auxiliary cathode ray tube 22 to proceed from the left-hand end of the lines in Figure 3 to the aperture in that line. Thus in line 26 if aperture 36 is located as shown at the extreme right hand end of the line, the horizontal pulses applied to the cameras will be delayed a maximum amount. In line 28 if the aperture is located mid-way along the line, the horizontal synchronizing pulses will be delayed a lesser amount, and so forth.

The arrangement at the receiver is illustrated in Figure 4. It will be noted that the unscrambling unit is shown within the dash line 48 and the circuit within this dash line is identical with the circuit within the dash line 50 of Figure 1. In operation, the composite signal including standard vertical and horizontal synchronizing pulses and the picture signals is applied to a synchronization pulse separator 52 with the vertical synchronizing pulses being applied directly to a vertical sweep oscillator 54. However, the standard horizontal synchronizing pulses or the output pulse of an AFC system locked on the horizontal pulses and vertical synchronizing pulses are also applied within the decoder to the horizontal sweep oscillator 20' and scale-of-4 counter 24', respectively. A punched card 34', identical with the transmitter card 34, is then placed in front of receiver auxiliary cathode ray tube 22' and coded horizontal synchronizing pulses will be reconstructed in phototube 44' and shaping tube 46', and these coded horizontal synchronizing pulses may then be applied to the receiver horizontal sweep oscillator 56. The coded horizontal sweeps generated in oscillator 56 are then applied together with the standard vertical sweeps from oscillator 54 in the viewing tube 58.

The recycling action in the scale-of-4 counter 24' may be initiated by the separation of the widened fourth vertical synchronizing pulse.

From the foregoing description it will be apparent that the relative timing delay in horizontal synchronizing pulses for every field is changed according to the position of the apertures in the punched cards 34 and 34' and therefore a picture in a receiver not equipped with a decoding unit will be impossible or uncomfortable to view.

Figures 5, 6:
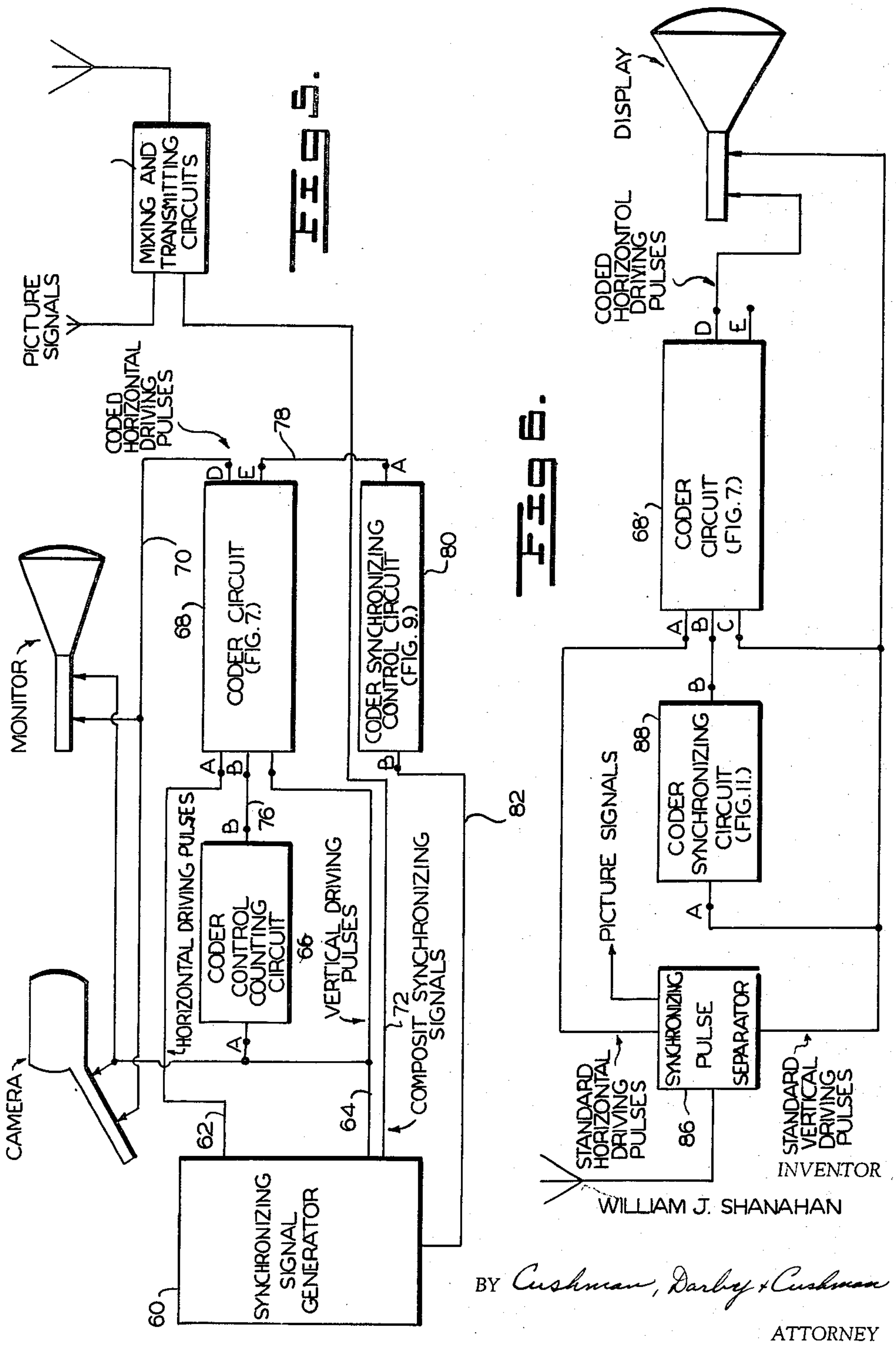
Figure 5 shows a block diagram of a transmitting section which is a preferred embodiment of my invention.
Figure 6 shows a receiver section which is a preferred embodiment of my invention.

The invention may be further and better understood with reference to another and preferred embodiment of my invention, which will now be described in detail. The description of the just-mentioned embodiment will proceed with reference first to the block diagrams in Figures 5 and 6. Referring to Figure 5, the system at the transmitting station is shown. A synchronizing signal generator 60 is provided for producing horizontal and vertical driving pulses on lines 62 and 64, respectively. The vertical driving pulses on line 64 are applied directly to the camera and monitor sweep circuits and are also applied to a terminal A of a scrambler control counting circuit 66 and to a terminal C of a scrambler circuit 68. The horizontal driving pulses on line 62 are applied directly to a terminal A of the scrambler circuit 68. The scrambler circuit 68 is arranged to produce at an output terminal D coded or delayed horizontal driving pulses and these pulses are connected over a line 70 with the horizontal sweeping circuits of the camera and monitor. A line 72 extending between the signal generator 60 and mixing and transmitting circuits 74 carries composite synchronizing signals for transmission with the picture signals.

An output terminal B of scrambler control counting circuit 66 is connected to an input terminal B of scrambler circuit 68 over line 76. As will be more fully explained below, periodically occurring pulses over line 76 serve to establish the code of the coded horizontal driving pulses on line 70. Also there is available at an output terminal E of scrambler circuit 68 a series of periodically occurring pulses which are connected over a line 78 to an input terminal A of a scrambler synchronizing control circuit 80 and control signals appearing at an output terminal B of circuit 80 are applied over line 82 to the synchronizing signal generator 60. The signals on line 82 are so employed, in a manner to be described below, that every *n*th vertical synchronizing signal of the composite synchronizing signals appearing on line 72 will be distinguished from the other vertical signals so that a scrambler circuit at the receiver may be maintained in synchronism with the scrambler circuit 68.

Referring now to Figure 6 showing a receiver, the received signals are introduced to a synchronizing pulse separator circuit 86 and standard horizontal driving pulses (synchronized with the horizontal driving pulses on line 62 of Figure 5) are applied to the terminal A of a scrambler circuit 68' which may be in all respects identical with circuit 68 of Figure 5. The standard vertical driving pulses obtained from circuit 86 are applied directly to the terminal C of circuits 68' and also to the terminal A of a synchronizing circuit 88. As will be explained hereinbelow, the synchronizing circuit 88 is responsive to each *n*th or distinctive vertical driving pulse to supply a signal from a terminal B of circuit 88 to terminal B of circuit 68'. This signal serves to keep coder circuit 68' in step with coder circuit 68 of the transmitting section. Coded horizontal driving pulses are then obtained at terminal D of circuit 68' and these are applied to the horizontal sweeping circuits of the receiver tube. The only difference in the use of circuit 68' over circuit 68 is that the signals available at terminal E of circuit 68' are not employed at the receiver.

Circuits suitable for each of the blocks of Figures 5 and 6 will now be discussed in somewhat greater detail.

Figure 7:
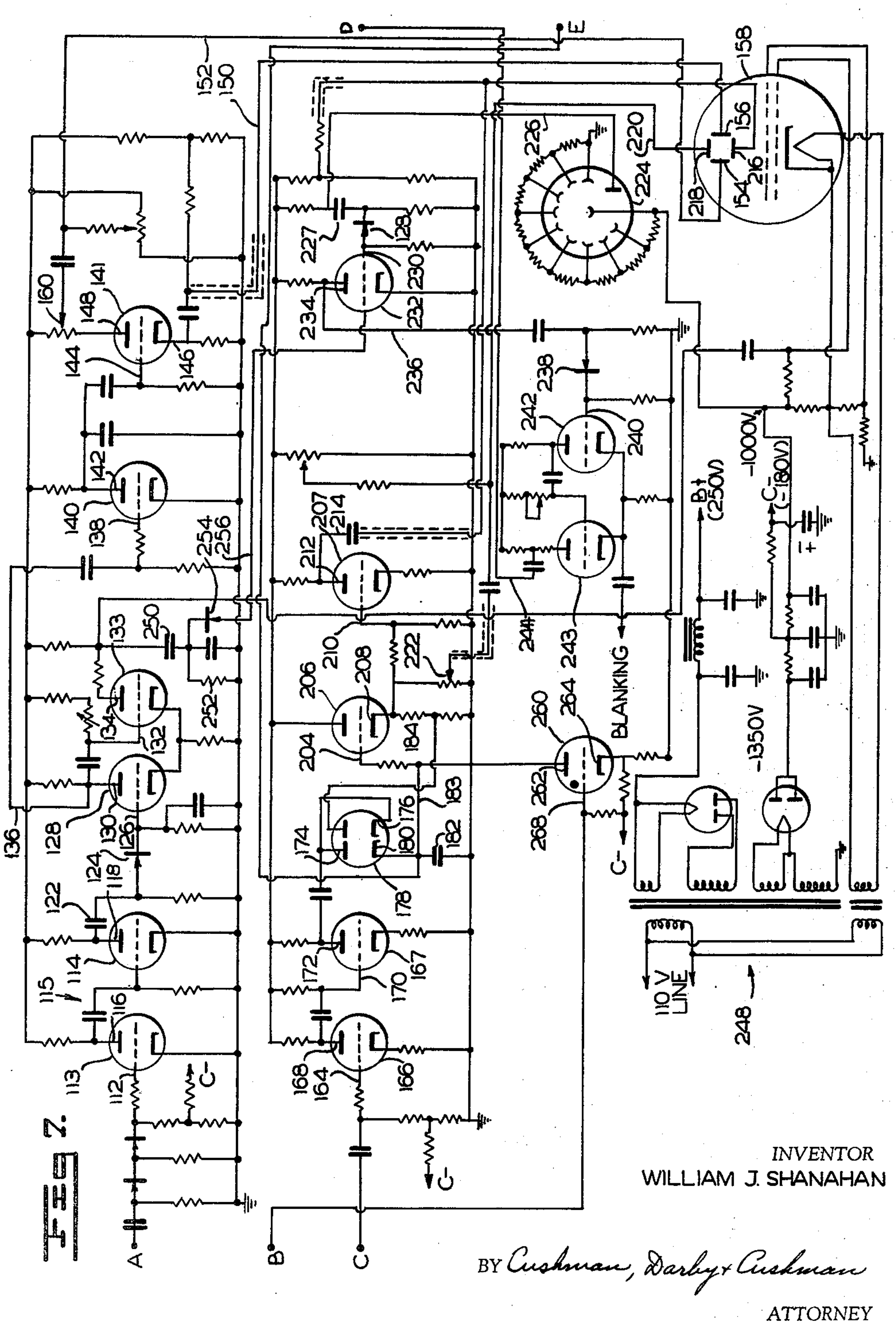
Figure 7 shows a schematic circuit diagram of a preferred form of scrambler circuit according to my invention.

Next referring to Figure 7 the circuit shown in this figure is intended for use within the blocks 68 and 68' and corresponds with the just mentioned blocks as to the terminal A–E. In this figure the so-called standard horizontal driving pulses are applied as indicated in Figures 5 and 6 to the input terminal A. From terminal A the pulses are applied through conventional circuitry to the grid 112 of the first stage of a two-stage amplifier section comprising tubes 113 and 114 and designated generally 115. Amplified horizontal synchronizing pulses appear at anode 116 of tube 113 and then at anode 118 of tube 114, and from there are applied through a capacitance 122 and crystal diode 124 to an input grid 126 of a tube 128 having its anode 130 connected with the grid 132 of a second tube 133 to form a multi-vibrator. The anode of the second tube 133 is designated 134. From the anode 130 of tube 128 a negative square wave appears upon the occurrence of every pulse at terminal A. This is coupled over line 136 to a grid 138 of a tube 140. Tube 140 is arranged to produce a positive sawtooth sweep which is then coupled into the grid 144 of a tube 141, thereby producing a positive sawtooth voltage at its cathode 146 and a negative sawtooth voltage at its anode 148. The cathode and anode sawtooth voltages are then coupled over lines 150 and 152, respectively, to horizontal deflecting plates 154 and 156 of an auxiliary cathode ray coding tube 158. Tube 158 and the arrangement of the punched card 34 may be in all aspects identical with the tubes 22 and 22' mentioned in connection with the first described embodiment. The amplitude of the deflection caused by the horizontal plates 154 and 156 may be conveniently controlled by a potentiometer 160 in the circuit of anode 148 of tube 141.

From the foregoing description it will be apparent that each horizontal driving pulse applied to terminal A will produce a horizontal or line sweep in the cathode ray tube 158.

Continuing to refer to Figure 7, the vertical sweep for the auxiliary cathode ray tube 158 is controlled by applying the standard or station vertical driving pulses to terminal C. The pulses applied to terminal C are coupled to the grid 164 of a tube 166. The anode 168 of tube 166 is coupled to the grid 170 of a tube 167 and accordingly pulses on grid 164 are amplified and inverted so that positive square waves appear at the anode 172 of tube 167. The pulses at 172 are coupled to the first anode 174 and the second cathode 176 of a dual diode tube 178. The appearance of positive pulses at anode 174 will cause conduction through the first half of tube 178 to cathode 180, the latter being connected to ground through a capacitance 182. As will become more fully apparent hereinbelow, each successive vertical pulse will cause a step-by-step integration of charge on capacitor 182 which will be employed to produce a stepped waveform employed in the vertical scanning of the auxiliary cathode ray tube 158.

In the line between cathode 180 and capacitor 182 there is connected a line 183 which connects to a grid 204 of a tube 206 through resistor 184. The waveform at the cathode 208 of tube 206 is connected with the grid 210 of a tube 207 and an amplified stepped or staircase waveform will appear at the anode 212 of tube 207. The waveform at anode 212 will be an inverted or negative waveform, and this is coupled over a line 214 to a vertical deflecting plate 216 of the auxiliary cathode ray tube 158. A positive going stepped waveform is applied to the other vertical deflection plate 218 by coupling over a line 220 to a potentiometer 222 in the circuit of cathode 208 of tube 206.

It will be apparent from the foregoing that the occurrence of each vertical driving pulse at terminal C will add a step of charge to the capacitance 182 until a requisite number of vertical driving pulses has occurred to cause the capacitance 182 to be discharged (in a manner to be described). When discharge occurs, the stepped waveform which appears at potentiometer 222 and anode 212 will return to its starting potential. Stated otherwise with reference to Figures 2 and 3, upon occurrence of a first vertical driving pulse the repeated scanning of line

26 (Figure 2) will be established. The occurrence of the next vertical driving pulse will add charge to capacitance 182 and therefore the horizontal sweeps will now occur at line 28 in Figures 2 and 3, and so forth.

The result of the stepped voltage on plates 216 and 218 will be to deflect the cathode ray beam in steps, so that one after another of the lines 26, 28, 30, etc., of Figure 2 are scanned. It will be understood that each line is repeatedly scanned under control of the horizontal driving pulses, until a vertical pulse steps the scan to the next line.

As mentioned in connection with the first described embodiment, the spot on the face of cathode ray tube 158 will cause light to be transmitted through the apertures in the punched card at such time as the spot is passing the apertures. The persistence of the tube may be arranged to be such that the light-sensitive device associated with the tube will return to a quiescent condition before the spot again traverses the aperture.

In the embodiment of Figure 7, there is employed a multiplier-type photoelectric cell 224 having its output coupled over line 226 through a capacitance 227 to a crystal diode 228. The diode 228 then serves to couple the line 226 to the grid 230 of a tube 232. The tube 224 will normally be "dark" and therefore the light through an aperture in the punch card 34 will cause current to flow in the line 226 and a negative pulse will appear at grid 230 of tube 232. Accordingly, a positive pulse will appear at the anode 234 of tube 232. Anode 234 is coupled over a line 236 and through a crystal diode 238 to a grid 240 of a multi-vibrator comprising tubes 242 and 243. Anode 245 of tube 243 is coupled to terminal D and thus there will be produced at terminal D over a line 244 a coded horizontal driving pulse. This pulse may then be employed as shown in Figures 5 and 6 to drive the camera and monitor in the transmitting station and to drive the viewing tube in the receiving station. The waveform available across the resistance 246 in the cathode circuits of tubes 242 and 243 may be employed to provide a blanking waveform for use if desired to blank the presentation tubes.

A conventional power supply circuit designated generally as 248 is illustrated as connected to supply suitable operating potentials to the various tubes employed in the complete coding circuit.

To insure that there be no loss of horizontal or line driving pulses to a receiver being decoded during the stepping interval, the positive output waveform appearing at the anode 134 of the tube 133 is differentiated by means of capacitance 250 and resistance 252. The positive differentiation pulse is suppressed by crystal diode 254 but the negative pulse is connected over line 256 to the grid 230 of previously mentioned tube 232. The action of this pulse at tube 232 will be the same as that of a pulse arriving over line 226 from photocell 224. However, if a pulse from line 226 has already triggered the multivibrator made up of tubes 242 and 243, a pulse from line 256 (which will be subsequent in time, being the trailing differentiation pulse) will not affect the multivibrator action. Also, pulses on line 256 will not occur until after the last possible code pulse.

The capacitance 182 may be discharged upon the occurrence of predetermined vertical driving pulses by provision of a tube 260 having its anode 262 connected to the cathode 180 of diode tube 178 and having the cathode 264 of tube 260 connected to ground through a resistor 266. Tube 260 is of a discharge type or of a grid control type and when the grid 268 is momentarily raised to a sufficiently positive potential the capacitance 182 will discharge through tube 260. The grid 268 is connected with terminal B of circuits 68 or 68', and the signal for controlling grid 268 is obtained, in the transmitter, from control counting circuit 66 and in the receiver, from the synchronizing circuit 88. These interconnections have been mentioned above in connection with Figures 5 and 6.

The manner of generating special vertical synchronizing signals for maintaining the coder circuits of the transmitter and receiver in step will now be described. It will be understood that the most practical coding arrangement calls for identical punched cards in the transmitter and receiver. Therefore, it is clear that when the auxiliary cathode ray tube 158 at the transmitter is scanning line 26 (Figure 2) the auxiliary cathode ray tube 158 at the receiver should also be scanning line 26, then both should scan line 28, and so forth. In other words, the stepped waveforms controlling the vertical deflection plates of the auxiliary cathode ray tubes should be in synchronism.

To generate a special vertical synchronizing signal every *n*th signal, the vertical driving pulses available over line 64 (Figure 5) from the synchronizing signal generator 60 are applied to terminal A of the control counting circuit 66. Circuit 66 may be any one of a great number of types of counting circuits which are well known. Accordingly, it is believed unnecessary to describe any particular counting circuit in detail. The counting circuit will be so arranged as to produce a single output pulse upon the occurrence of every *n*th input pulse. This relationship of pulses is illustrated in Figures 8*a* and 8*b* where *n* is taken as 4.

As previously indicated, the output of the counting circuit appears at terminal B of circuit 66. This terminal is connected with terminal B of circuit 68 over line 76. Accordingly, the output pulses of Figure 8*b* will be applied to the grid of tube 260 of circuit 68 and the capacitance 182 of circuit 68 will be discharged. Accordingly, the waveform at capacitance 182 will be of stepped form as illustrated in Figure 8*c*.

Figures 8A, 8B, 8C, 8D, 8E, 8F, 8G, 8H:
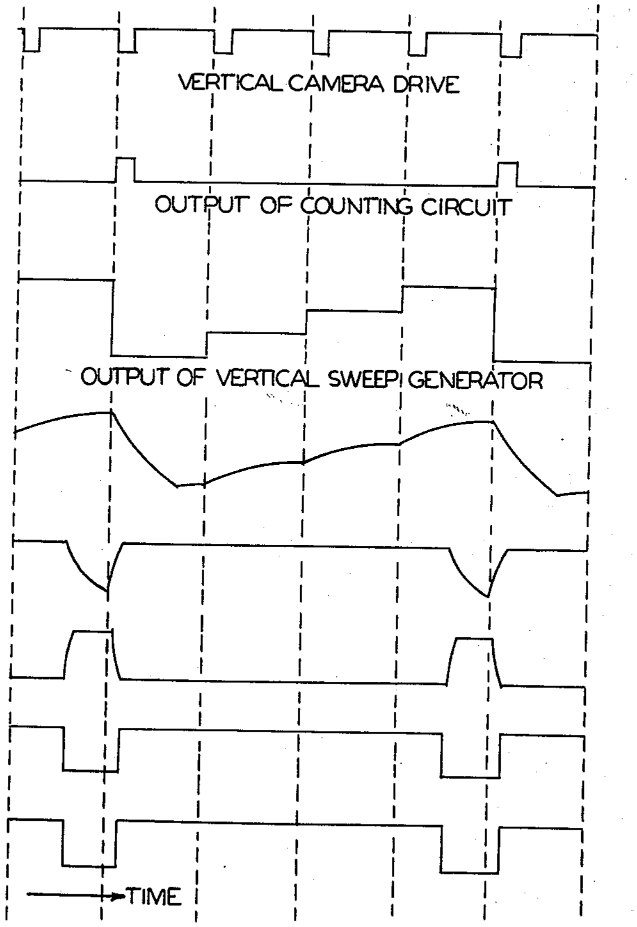

As thus far explained, it will be apparent that upon the occurrence of every *n*th vertical driving pulse at the transmitter the capacitance 182 will be discharged and the step waveform of Figure 8*c* will return to its starting point.

Since it is necessary to transmit a special pulse upon the occurrence of the end of a stepped waveform so that the stepped waveform in the receiver may also be ended, the voltage available across the capacitance 182 is made available at the terminal E of circuit 68 and this voltage is applied over line 78 to terminal A of the synchronizing control circuit 80.

Circuit 80 is further illustrated in Figure 9 to which reference is now made. The step waveform of Figure 8*c* available at terminal A of circuit 80 is first integrated in an integrating circuit consisting of resistance R and capacitance C so that the waveform of Figure 8*d* appears at point (*b*) of circuit 80. The waveform of Figure 8*d* is then applied to a biased amplifier circuit 300 so that the peaks of the waveform of Figure 8*d* are amplified and inverted as illustrated in Figure 8*e*. The waveform of Figure 8*e* appears at point (*c*) of circuit 80. This waveform is then amplified and clipped in circuit 310 producing the waveform shown in Figure 8*f* at point (*d*) of circuit 80 and this waveform is further amplified and clipped in circuit 312 to produce at point (*e*) of circuit 80 the waveform illustrated in Figure 8*g*. This latter waveform is then applied to a cathode follower circuit 314 and the square waveform illustrated in Figure 8*h* is available at terminal B of circuit 80. A direct current clipping circuit 316 is connected with terminal B to control the amplitude of the square waveform.

From the waveforms as illustrated in Figures 8*a–h* it will be apparent that as the step waveform of Figure 8*d* is approaching its upper limit whereat a counting pulse will discharge the capacitance 182 at the transmitter a broad pulse as illustrated in Figure 8*h* is available over line 82 (Figure 5) for causing the transmission of a special vertical synchronizing signal over line 72.

As will be well understood by those skilled in the art, the synchronizing signal generator 60 may comprise a number of multi-vibrator circuits so interconnected and timed that vertical synchronizing signals may be produced on line 72 of the form shown in Figure 10*a*. In Figure 10*a* the vertical synchronizing pulse proper is made up of a group of closely spaced pulses of total width *a* with equalizing pulses occurring before and after the vertical pulse proper. Now, if the broad pulses illustrated in Figure 8*h* are applied over line 82 to the grid of the multi-vibrator of circuit 60 which controls the number of the closely spaced vertical pulses (those within *a* of Figure 10*a*), the number of these pulses may be increased to *a'* as illustrated in Figure 10*b*. Therefore, upon the occurrence of each pulse of Figure 8*h* a vertical synchronizing signal of the type shown in Figure 10*b* will be available for transmission to the receiver.

Referring now to Figure 6, at the receiver the synchronizing pulse separator 86 will segregate the pulses as indicated by legend in Figure 6 and the circuit 86 may have an integrating characteristic and therefore be responsive to vertical signals of width *a'* (Figure 10*b*) to produce a correspondingly elongated vertical driving pulse which is applied to terminal A of synchronizing circuit 88.

The synchronizing circuit 88 may be understood with reference to Figure 11. This circuit is characterized by provision of a conventional blocking oscillator circuit within the inner dash line block designated 410. Upon sufficient rise of potential at the grid 412 of a first tube 414 the oscillator will be fired and a pulse representative of the cycle of the oscillator will be available over lead 416 to the terminal B. All of the vertical driving pulses will of course appear at terminal A of circuit 88. However, those of standard duration *a* as illustrated in Figure 10*a* will not sufficiently affect the grid 412 because of an integrating circuit consisting of resistance R and capacitance C which is of such RC factor as to prevent any appreciable increase of voltage across capacitance C. However, upon the occurrence of a lengthened driving pulse based on the pulse duration *a'* of Figure 10*b* the voltage across capacitance C will increase sufficiently to fire the oscillator 410. The firing point of oscillator 410 may be conveniently controlled by potentiometer 418. Accordingly, a pulse will be available at terminal B over line 416. Referring again to Figure 6, the pulse available at terminal B of circuit 88 will be applied to terminal B of circuit 68' and, referring to Figure 7, this pulse will serve to fire the discharge tube 260 to return the step waveform across capacitance 182 to its starting point.

In view of the foregoing it will be apparent that the circuits 68 and 68' will be maintained in step and therefore punch cards having identically located code apertures may be simultaneously employed at the transmitter and receiver to permit unscrambling of the picture on the receiver tube. Since the picture signals begin only upon occurrence of the coded driving pulses at the transmitter, if the receiver is not equipped with a coder, the tube sweeps will begin on standard or uncoded driving pulses and therefore each line will be placed at an incorrect location on the tube face and a scrambled picture will result.

While for purposes of description in the foregoing and particularly in Figure 8, the scrambling has been based on 4 different frame positions, it will be understood that this may be increased to *n* positions as desired. Normally, more than 4 positions will be desired to more effectively smear the picture on the face of the receiving tube, and to increase the possible number of codes.

Moreover, it will be understood that the displacement or distortion of the picture on the receiving tube can be based upon any other recurring condition such as the occurrence of every horizontal line, every group of *n* horizontal lines, and so forth, with the displacement being effective by treating the vertical synchronizing signals as well as the horizontal signals. That is, as an example, the standard horizontal pulses could be employed throughout the system, and the vertical driving pulses delayed to establish a code.

It will be further apparent that depending upon the authorized television broadcasting standards at any particular time the synchronization between the scrambling circuits at the transmitter and receiver can be based on pulse duration, pulse amplitude, pulse counting and so forth. Basically, all that is required is that a scrambler synchronizing signal of some type be transmitted at the proper moment.

There will also occur to those skilled in the art means other than the auxiliary cathode ray tube, punched card and photocell for sensing the code. For example, an electrostatic storage type tube may be employed, having a plurality of sensitive areas to be connected according to a code.

This application is a continuation of my copending application Serial No. 255,555, filed November 9, 1951, now abandoned, and this application is entitled to the filing date of the aforesaid application and my still earlier related application Serial No. 207,928, filed January 26, 1951, now abandoned, for all common subject matter.

In view of the many specific embodiments of the invention which will occur to others upon reading the specification, it is not intended that this invention be limited to the particular embodiments illustrated and described. On the contrary, it is intended that the invention be limited only by the scope of the appended claims.

What is claimed is:

1. In a scrambled television system, means for generating and transmitting horizontal and vertical synchronizing signals along a given channel, means for generating and transmitting video signals along the same channel, mode means coupled to each of said generating means for controlling the transmission of the video signals to cause the transmitted video signals from time to time to be in one of a plurality of different time modes with respect to the generated synchronizing signals according to changeable code plans, changeable means being included in said mode means for determining the code plan at pre-selected times, means coupled to said channel for receiving and displaying the video signals including means responsive to the horizontal synchronizing signals in said channel for controlling the display on a line to line basis, means coupled with the receiving and displaying means for progressively resolving the modes of the video signals according to the changeable code plan in use, the just mentioned means being arranged to operate in correspondence with the mode creating means, means for generating and transmitting correspondence signals along said channel, means including means responsive to the transmitted correspondence signals for maintaining the respective mode controlling and resolving means in correspondence, and other changeable means included in said resolving means and corresponding to the first mentioned changeable means for determining the code plan of the mode resolution means at said pre-selected times in accordance with information received independently of the system.

2. A system as in claim 1 wherein the first mentioned changeable means includes a replaceable record card having indicia thereon and said mode means includes means responsive to said indicia for determining the modes of video transmission.

3. A system as in claim 1 wherein said other changeable means includes a replaceable record card having indicia thereon, and the mode resolving means includes means responsive to said indicia for determining the resolution of the modes of received video signals.

4. A system as in claim 1 wherein said means for controlling the transmission of the video signals is operative in cycles among a plurality of different states for each code plan, and wherein the mode resolving means is similarly operative in cycles among a plurality of states.

5. A system as in claim 1 wherein the means for controlling the transmission of video signals includes means to maintain each given mode for a group of horizontal sweeps, and means to shift the last mentioned means from time to time among at least three states.

6. A system as in claim 1 wherein the means for generating said correspondence signals includes means for modifying predetermined ones of the transmitted synchronizing signals to distinguish same from the others.

7. A system as in claim 1 wherein the mode resolution means includes a cathode ray tube responsive to given sweep signals and a light sensitive device responsive to the light output of said tube, said changeable means therefor being a record card bearing apertures arranged according to a code plan and disposed between the face of the cathode ray tube and the light sensitive device for causing the latter to generate coded signals for driving the display means.

8. A system as in claim 7 wherein the light sensitive device generates coded horizontal synchronizing signals.

9. In a scrambled television system of the type wherein video signals are transmitted to a system display device having a plurality of deflection means, from time to time in differing modes in the form of different time relationships between said video signals and transmitted regularly recurring synchronizing signals, and wherein signals distinctive from any of the aforementioned signals are also transmitted at predetermined times, the improvement comprising a decoding unit including a counter circuit operative in response to repetitive signals derived from the transmitted synchronizing signals for stepping an output through a plurality of states, means responsive to said distinctive signals for setting said counter to a predetermined one of said states at said predetermined times, an auxiliary cathode ray tube for producing a spot of light on its face and having two sets of deflection means operative at an angle to one another for sweeping said spot across said face, one deflection means being responsive to the counter output, the other deflection means being responsive to one set of the transmitted synchronizing signals, light sensitive means disposed in front of said tube for receiving the light projected by said spot, means for operating one of the deflection means of the system display device from the light sensitive means, a record card having only a single aperture in each of a plurality of different lines across the card, said card being disposed between the auxiliary cathode ray tube and the light sensitive device, the arrangement being such that during each state of the counter circuit, the spot of the auxiliary cathode ray tube will sweep out a different discrete line across the face thereof and across the card so that an aperture placed in the record card to coincide with the position of one of said lines and positioned therealong will generate a pulse in the light sensitive means when the cathode ray tube spot traverses the area of said aperture, the arrangement further being such that with a different placement of apertures along the various lines on said card, coded operation of the display device is accomplished.

10. A unit as in claim 9 wherein the counter circuit is stepped by received vertical synchronizing signals and said other deflection means of the auxiliary cathode ray tube is controlled by received horizontal synchronizing signals, the arrangement being such that the output of the counter circuit operating on said one of the cathode ray deflection means establishes a first line thereacross which is repetitively scanned under action of the received horizontal synchronizing signals until the counter steps to its next position, thus establishing another line.

11. A unit as in claim 9 wherein the signals generated by the light sensitive means control the horizontal deflection of the display device to provide delayed horizontal sweeps relative to the transmitted horizontal synchronizing signals.

12. A circuit for generating variously delayed pulses from regularly recurring pulses including a cathode ray tube for producing a spot of light on its face and having two deflection means at an angle to one another for sweeping said spot across said face, a counter circuit driven by regularly recurring pulses for cyclically producing a plurality of different output conditions, the counter circuit output controlling one set of the cathode ray tube deflection means, the other set of cathode ray tube deflection means being controlled by regularly recurring pulses of repetition rate at least equal to the counter circuit output, a light sensitive device for receiving the light projected by said spot, said device being disposed in front of the face of said tube, a member having only a single indicium in each of a plurality of lines across the member, said lines corresponding in number to the number of counter circuit output conditions and the indicia being uniform in line width, said member being disposed between the face of the cathode ray tube and the light sensitive device for altering line propagation characteristics between the cathode ray tube face and the light sensitive device, the arrangement being such that the spot of the cathode ray tube will sweep out a discrete line across the tube face and across said member for each output condition of the counter circuit and each time the spot traverses one of said indicia on the member a change in light propagation to the light sensitive device will occur thereby generating a pulse in the device, the overall arrangement being such that only one pulse in the light sensitive device will be generated during the sweep of a given line, the time occurrence of the pulse being delayed an amount dependent upon the length of the line sweep before the spot encounters the indicium for that line.

13. A system for transmitting scrambled pictures comprising transmitter and receiver means respectively including at least one camera and a display device, means for supplying regularly recurring vertical and horizontal type synchronizing signals at the transmitter means, the transmitter means comprising an auxiliary cathode ray tube for producing a spot of light on its face, a light sensitive device disposed in front of said face to receive the light projected by said spot, a code member having coded apertures therein, a single aperture only being in each of a plurality of lines across said member which is positioned between the face of the auxiliary cathode ray tube and the light sensitive device for changing the amount of projected light received by said device, means to develop a scan in the auxiliary cathode ray tube under control of the horizontal and vertical synchronizing signals for causing said projected light to trace said lines sequentially, means for making every *n*th one of one type of said synchronizing signals distinctive, means connected with the light sensitive device for producing coded horizontal synchronizing signals for driving said camera, means for transmitting the synchronizing signals including the distinctive signals along with the picture signals, the receiver means comprising a receiver auxiliary cathode ray tube for producing a spot of light on its face, an associated light sensitive device disposed in front of the face of said receiver tube for receiving the projected light therefrom, a receiver code member having coded apertures therein, a single aperture only being in each of a plurality of lines across said receiver code member, the number of such lines being the same as the number of such lines in the transmitter code member, the relative positions of the apertures in corresponding lines of the transmitter and receiver code members being in correspondence said second code member being positioned between said receiver cathode ray tube and associated light sensitive device for changing the amount of projected light received by the latter, means responsive to the transmitted synchronizing signals for developing a scan in said receiver tube for causing its projected light to trace said lines on the receiver code member, means coupled to the last mentioned means and responsive to said distinctive signals for causing the light projected from the receiver cathode ray tube to trace the receiver code member lines in synchronism respectively with the tracing of the corresponding transmitter code member lines, and means connected with said associated light sensitive device for producing coded horizontal synchronizing signals corresponding respectively to those produced for the transmitter camera, the coded horizontal receiver synchronizing signals being employed to drive the receiver display device to reconstitute an image scanned at the transmitter camera.

14. In a scrambled television system, means for generating regularly recurring horizontal and vertical type synchronizing signals, means for deriving given sweep signals from said synchronizing signals, means for generating video signals in response to said sweep signals, means coupled to both of said generating means for transmitting said synchronizing and video signals along a given channel, scrambling means responsive to said synchronizing signals for varying the time relation between the transmitted video and synchronizing signals from time to time among a plurality of differently timed relationships according to changeable code plans, said scrambling means including changeable means for determining one set of said timed relationships and the sequence thereof in said one set all in accordance with a given code plan, means coupled to said scrambling means for generating a correspondence signal for a given number of one type of said synchronizing signals, said last mentioned means being coupled to said transmitting means for transmitting the correspondence signals along said given channel, and receiver means coupled to said channel for displaying the video signals as a picture including means for generating given receiver sweep signals from the transmitted synchronizing signals for controlling the display on a line to line basis, said receiver sweep signal generating means including unscrambling means responsive to the transmitted synchronizing and correspondence signals for varying the time relation between the received video and synchronizing signals from time to time among a plurality of unscrambling time relationships in correspondence with said varying by the scrambling means, said unscrambling means including other changeable means for determining a set of unscrambling time relationships corresponding respectively to the relationships in said first mentioned set.

15. In transmitting apparatus for a scrambled television system having a picture displaying receiver with unscrambling means including commutation means, the improvement comprising means for generating picture signals, means for generating horizontal and vertical synchronizing signals, mode means coupled to each of said generating means for causing said picture signals to be in any one of a plurality of modes in at least two of which the time relationship between the picture signals and said synchronizing signals is different, means for transmitting said synchronizing signals in a selected picture signal mode along a given channel, transmitter commutation means coupled to said mode means and having a plurality of different states for selecting a different one of said modes from time to time to effect mode changing at a rate sufficient to render an unauthorized receiver display unintelligible, and means for generating and transmitting along said channel correspondence signals for maintaining synchronizing between said transmitter commutation means and the receiver commutation means.

16. Apparatus as in claim 15 wherein the correspondence signal generating means is responsive to one type of said synchronizing signals and generates from every *n*th one of said signals a distinguishing signal as the said correspondence signal.

17. Apparatus as in claim 15 wherein the modes are generated in accordance with changeable code plans and the mode means includes a plurality of exchangeable means for respectively changing the code plan at preselected times.

18. Apparatus as in claim 17 wherein the mode means further includes means including a cathode ray tube for producing a sweeping spot of light on the face of said tube and light sensitive means responsive to said spot of light, each of said exchangeable means being a card bearing aperture arranged according to a respective one of said code plans and disposed between said tube and light sensitive means one at a time, said tube being responsive to the different states of the transmitter commutation means for generating in the light sensitive means code signals representing a different mode for each of said states.

19. In receiving apparatus for receiving a scrambled picture transmission wherein picture signals are transmitted along a given channel in one of a plurality of different modes during different time periods which occur at a rate sufficient to render an unauthorized receiver display unintelligible, wherein horizontal and vertical synchronizing signals are transmitted along said channel, the time relationship between the transmitted picture and synchronizing signals being different in at least two of said modes, and wherein correspondence signals representing the operation of the transmitter commutation means are also transmitted along said channel, the improvement comprising means coupled to said channel for resolving the different modes of said picture signals, means coupled to the last mentioned means for displaying a selected mode of the picture signals as a picture, means coupled to said channel for detecting said synchronizing signals, means coupled to said channel for detecting said correspondence signals, and multi-state commutation means coupled to the mode resolving means and responsive to the detected synchronizing and correspondence signals for selecting during the occurrence of each of its states a different mode to be displayed, said receiver commutation means being operated in synchronism with said transmitter commutation means by virtue of said correspondence signals.

20. Apparatus as in claim 19 wherein the correspondence signals are respectively every *n*th one of one type of the said synchronizing signals and distinguishable from others thereof and wherein the correspondence signal detecting means provides an output signal to the receiver commutation means for each of such correspondence signals.

21. Apparatus as in claim 19 wherein the picture signals are received in modes determined in accordance with changeable code plans and the mode resolving means includes a plurality of exchangeable means for respectively changing the receiver code plan at preselected times.

22. Apparatus as in claim 21 wherein the mode resolving means further includes means including a cathode ray tube for producing a sweeping spot of light on the face of said tube and light sensitive means responsive to said spot of light, each of said exchangeable means being a card bearing aperture arranged according to a respective one of said code plans and disposed between said tube and light sensitive means one at a time, said tube being responsive to the different states of the receiver commutation means for generating in the light sensitive means a different mode for each of said states.

References Cited in the file of this patent

UNITED STATES PATENTS

| | | |
|---|---|---|
| 2,251,525 | Rosenthal | Aug. 5, 1941 |
| 2,402,058 | Loughren | June 11, 1946 |
| 2,472,774 | Mayle | June 7, 1949 |
| 2,547,598 | Roschke | Apr. 3, 1951 |
| 2,601,505 | Ellet | June 24, 1952 |
| 2,656,405 | Roschke et al. | Oct. 20, 1953 |
| 2,816,156 | Pawley | Dec. 10, 1957 |